Nov. 18, 1941.  F. SONNENSCHEIN  2,262,973
FACING PLATE
Filed June 3, 1939
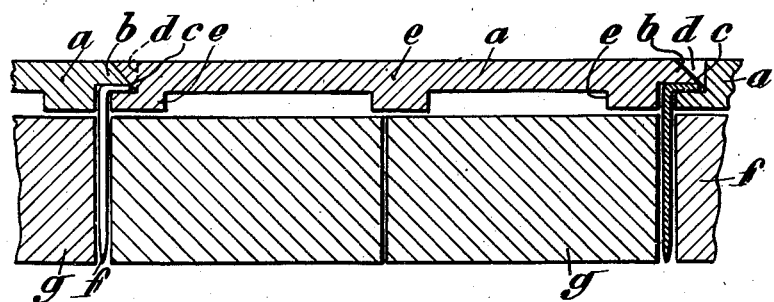
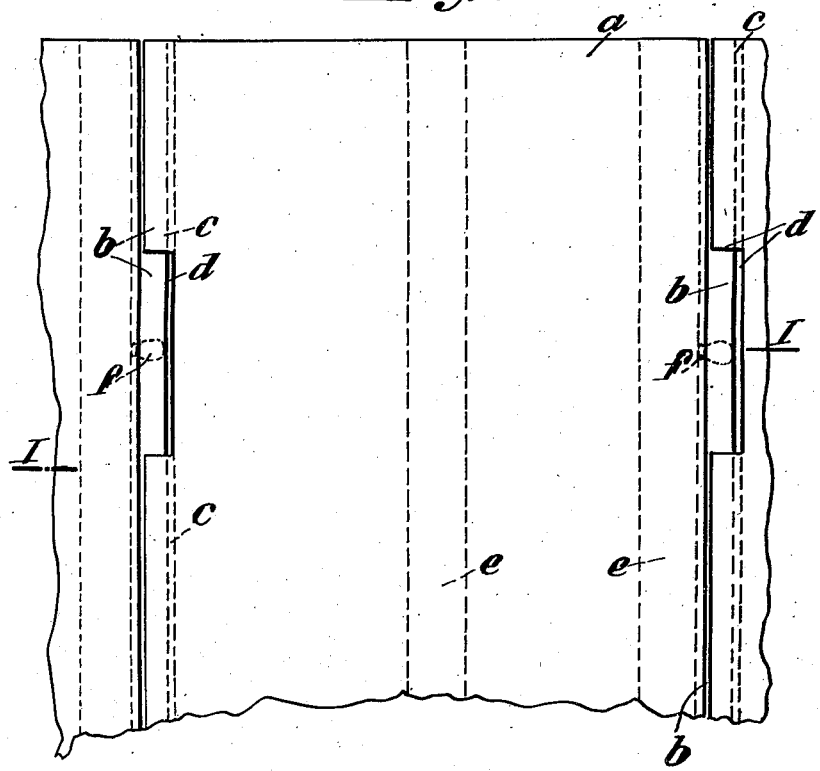
Frank Sonnenschein
INVENTOR
By Otto Munk
his ATTY.

Patented Nov. 18, 1941

2,262,973

UNITED STATES PATENT OFFICE 2,262,973

FACING PLATE

Frank Sonnenschein, Chicago, Ill.

Application June 3, 1939, Serial No. 277,293
In Germany June 3, 1938

3 Claims. (Cl. 72—19)

The invention relates to the securing of facing plates or slabs to brickwork. The facing plates may, for example, be insulating plates, or slabs designed to form an air space when fixed to the wall, functioning in the manner of a chimney to dry the wall. In one known form of construction such facing plates are provided with interengaging tongues annd grooves, and the grooves are adapted for the reception of the heads of the securing members, which are driven into the mortar joints in the case of brickwork. Of the two lips which together form the groove, that which is nearest to the body of the masonry will, in such a construction, be engaged by the head of the securing member. The head is then covered by the tongue of the next plate.

In the construction according to the present invention, the outer lip of the groove is cut away to provide clearance for the insertion of the securing members, and the heads of the securing members are covered by the tongues of the adjacent plates. Such a construction has the advantages of tongue and groove connection, and at the same time the advantage that it is possible to drive in the fixing hook without danger from hammer blows to the outer lip of the groove. The arrangement of a number of the plates in series can thus be carried into effect without leaving behind noticeable joints.

When dimensioning the length of the cut away portions of the outer lip it is desirable to take into consideration the distance between the joints in the masonry. The length of the cut away portion should be such that, whatever the position of the plate, at least one entire joint of the masonry will be found between the ends of the cut away portion and will thus be available for the driving in of the securing member. For this purpose the minimum length of the cut away portion which is sufficient in the case of brickwork is equal to one joint width plus the distance between two joints. Since in this case the joint and so the position of the head of the securing member could lie just at one end of the cut away portion of the outer lip and hence the outer lip could be endangered, it is preferable to dimension the length of the interruption as the sum of twice the thickness of a joint and the thickness of one layer of bricks.

In the accompanying drawing there is represented an embodiment by way of example of the construction according to the present invention. Fig. 1 is a sectional plan taken on the line I—I of the elevation shown in Fig. 2. Fig. 2 is a vertical section through the masonry with the plate depicted in elevation.

The facing plates or slabs $a$ intended for the insulation of the body of brickwork $g$ are furnished with ribs, $e$, $e'$, $e''$. At the rib $e$, the edge of one plate comprises an inner lip placed close to the brickwork, on which the head of the securing member $f$, to be driven into the masonry joint, engages, and comprises also a groove $c$ for the introduction of the bevelled rib $b$ forming the tongue of the adjacent plate $a$. The groove $c$ defined by an outer lip on the first plate undercut to correspond with the bevelled tongue. This outer lip is provided at certain points, where fixing securing members are to be placed, with a cut away portion $d$. The length of the cut away portion $d$ is at least such that, without having to settle beforehand a definite distribution of the slabs $a$ in relation to the masonry joints, one whole masonry joint will certainly lie undivided between the ends of the interruption and thus be available for the driving in of the securing member $f$ without endangering the outer lip. In order to prevent this masonry joint from appearing too close to one end of the cut away portion $d$, it is advantageous to dimension the length of the cut away portion so that it corresponds to the thickness of two masonry joints plus the thickness of the layer of bricks between them.

Having now particularly described and ascertained the nature of my said invention and in what manner the same is to be performed, I declare that what I claim is:

1. A facing slab for building construction having tongue and groove edges, the groove being formed to provide inner and outer lips of substantially equal depth, a short length of the outer lip being completely cut away to provide clearance for driving in of a securing member.

2. A building construction including a wall, a facing for said wall comprising a plurality of slabs, each having tongue and groove edges and members securing the slabs to the wall, the groove in said slabs being formed to provide inner and outer lips of substantially equal depth, a short length of the outer lip being completely cut away to provide clearance for driving in said securing member, the said securing member being covered by the tongue edge of the adjacent slab.

3. A building construction including a brick wall, a facing for said wall comprising a plurality of slabs each having tongue and groove edges, means for securing said slabs to said brick wall, the groove in said slabs being formed to provide outer and inner lips of substantially equal depth, a short length of the outer lip being completely cut away to expose that portion of the inner which covers at least one joint of said wall and to afford clearance for the insertion of said securing means, said securing means being covered by the tongue of the adjacent slab.

FRANK SONNENSCHEIN.